G. B. Hutchinson,
Cider Press.
Nº 37,579. Patented Feb. 3, 1863.
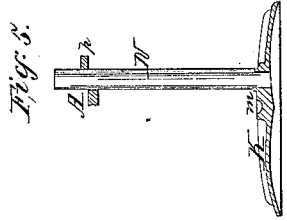
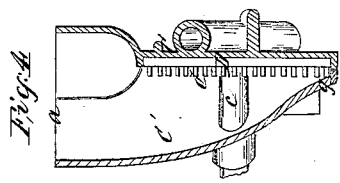
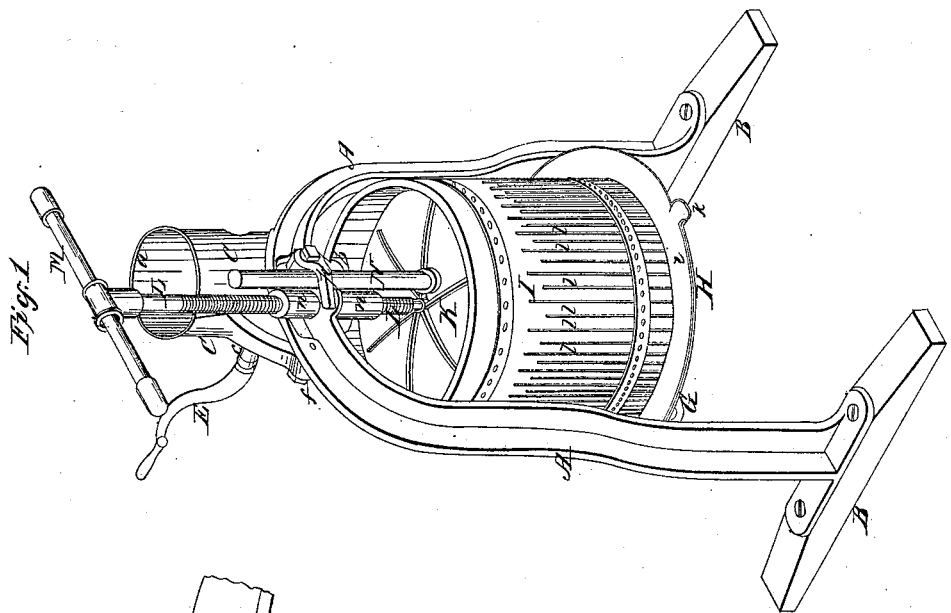
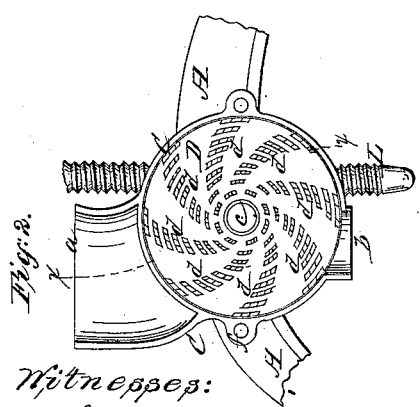
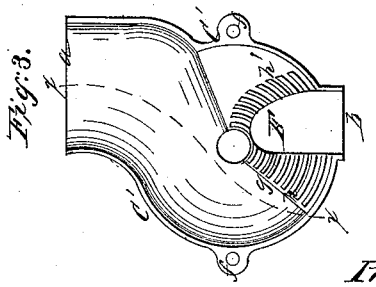
Witnesses:
Chas. H. Spencer
R. J. Osgood.
Inventor:
G. B. Hutchinson.
by J. Fraser &co. Attys

UNITED STATES PATENT OFFICE.

C. B. HUTCHINSON, OF AUBURN, NEW YORK.

IMPROVEMENT FOR GRINDING AND PRESSING GRAPES, APPLES, &c.

Specification forming part of Letters Patent No. 37,579, dated February 3, 1863.

*To all whom it may concern:*

Be it known that I, C. B. HUTCHINSON, of Auburn, in the county of Cayuga and State of New York, have invented certain new and useful Improvements in Portable Machines for Grinding and Pressing Grapes, Apples, and other Fruits; and I do hereby declare that the following is a full and exact description thereof, reference being had to the accompanying drawings, making part of this specification.

Figure 1 is a perspective view of my improved machine; Fig. 2, an enlarged elevation of the inside of one section or half of the hopper, with a portion of the frame detached and with the grinding-wheel in place, the other half of the hopper being removed; Fig. 3, a similar elevation of the inside of the other section or half of the hopper detached; Fig. 4, a section of the hopper in the path of the curved line $x\ x$, Figs. 2 and 3; Fig. 5, a central vertical section of the follower, with its guide-stem in elevation.

Like letters of reference indicate corresponding parts in all the figures.

It is the object of my invention to produce a cheap, compact, and portable machine for domestic use, by which the grinding and pressing of the fruit may be accomplished with but little labor and trouble, and in which both devices are combined in a convenient manner, so that the pomace falls directly from the grinding-mill into the press without the intervention of chutes or other apparatus for the purpose.

The working parts are all connected with a suitable frame, A, secured to bases B B, and usually of arched or rounded shape at its top, as is represented. On one side of the top of this frame, and forming a part of it, the whole being cast in a single piece, is situated one section or half, C, Fig. 2, of the hopper and case or bed, into which the fruit is placed for grinding. This hopper and bed consist of an induction-opening, $a$, at the top, and an eduction-outlet, $b$, at the bottom, the intermediate space being occupied by a circular area of suitable extent, within which rests a plane grinding-wheel, D, provided with a shaft, $c$, extending outward, and having attached thereto a winch, E, by which it is operated. On the face of the grinding-wheel are made sets $d\ d$ of projecting teeth, of suitable size for the purpose designed, diverging from the center outward to the periphery in curved lines, as represented, and the corresponding teeth of each set being concentric with and at the same distance from the center, so as to run in the same circular path. The number of sets, or the number of teeth in a set, may be varied as convenience or necessity may require. The teeth of each set are separated from each other by a space a little greater than the thickness of the teeth themselves.

The other section or half, C', of the hopper and grinding-case, Fig. 3, is of the same form in outline as that already described, and it has a central hole and bearing for the shaft of the grinding-wheel to pass through, so that the two sections can fit closely together when they are secured by means of bolts passing through lugs $f\ f$ at the sides. The lower portion of this half of the hopper, around the eduction-outlet, is made plain, of suitable extent, so as to fit closely to the teeth of the grinding-wheel; but above this surface the space in the hopper, from its top downward to the point $g$ of the plane, is made in the form of a spiral wedge, as indicated most clearly in Figs. 3 and 4. At a suitable position within the plane portion of this half of the hopper the eduction-passage extends upward nearly to the shaft of the grinding-wheel, forming a depression or hollow, F, of suitable depth and size to insure the proper discharge of the pomace, as will presently be described. On both sides of this depression on the plane surface are situated teeth $h\ h'$, similar to those on the grinding-wheel, being in like manner concentric, but alternating with them, so that those of one part shall pass between those of the other, and vice versa.

The arrangement above described insures a rapid and effectual grinding of the fruit, and also a perfect discharge from the grinding-wheel. The fruit as it is fed in is caught and carried downward by the teeth of the grinding-wheel, and as it is forced along the decreasing wedge-space of the hopper it is broken and crushed before it reaches the stationary teeth $h$. Here, by the intermatching of the two sets of teeth, it is ground into a pulp, and escapes into the discharge-depression F. That which still adheres to the wheel, and is carried over the discharge-aperture, is cleaned off by the intermatching with the raking-teeth $h'$ on the other side, so that when the wheel comes up again it is comparatively free. In ordinary devices the discharge is at the periphery or edge, and is so imperfect as to cause clogging or choking, and in this condition the fruit will not run down the hopper rapidly from the teeth not catching it. By making the discharge on the face of the wheel instead of the periphery, and with the depression F occupying nearly the extent of its radius, and of sufficient depth for the purpose, a perfect discharge is insured, as when the wheel comes opposite that point it is perfectly free and open. By their peculiar curved shape the sets of teeth on the grinding-wheel act similarly to a screw, to draw the fruit downward into the wedge-space of the hopper, and thus assist in rapidity of grinding.

At the proper position in the frame is situated a cross piece or support, G, Fig. 1, forming a part of the casting of the frame itself; and on this rests a pan or bed, H, usually of circular form and suitable diameter, having a groove, $i$, near its edge, and a spout, $k$, on one side for the discharge of the liquid as it is expressed. On this pan, inside the groove $i$, and under the hopper, rests a curb or receptacle, I, open at both ends, and of proper capacity for containing the pomace while it is being pressed. This curb, instead of having its slots $l\ l$ for the escape of the juice extend entirely from bottom to top, the whole height, has them extend only a portion of the distance—say about three quarters, more or less—thus leaving the top entire and unbroken, as clearly represented in Fig. 1. This arrangement is important on several accounts. While it allows the free passage of the liquid as it is expressed, it prevents the cloth that is placed over the pomace and under the follower from becoming torn and worn by catching into the slots as it would do if they extended entirely to the top, and thus avoids much trouble. The upper edge by being unbroken presents a smooth surface to the cloth, which, by the time the compression has reached the slots below, has become so fixed in place that it does not enter them. In addition to this, the curb is much stronger than if entirely divided into narrow strips or staves, with intermediate spaces, and the cost of construction is lessened, there being much less labor in preparing the staves, and it furthermore requiring a smaller number of screws or bolts to secure the staves to the hoops.

In the open end of the curb fits a follower, K, having a central bearing, $m$, on top, in which rests (simply while pressing) the end of a screw, L, extending upward through a screw socket or nut, $n$, cast in and forming a part of the frame, and thence to a suitable height, and having a cross-head, in the socket of which rests a lever, M, by which the power is applied.

I make the follower concave or hollowing on its under side, as shown most clearly in the section Fig. 5, for the purpose of lessening the direct pressure against the sides of the curb by having a tendency to draw the mass inward toward the center, and thus insure a more equal vertical pressure. By this arrangement the follower also is kept more steadily in place during the act of pressing, and is less liable to become inclined in one direction or another from the desired horizontal position by forming a hardened convex bed in the mass. To accomplish this result still more surely in preventing any possibility of the follower inclining in either direction, I secure a guide-stem, N, Figs. 1 and 5, in an eye formed in the follower at a little distance one side of the center, of suitable height for the purpose designed, and extending upward parallel with the pressure-screw, and resting in a half-circular bearing in the frame A, and having a button or catch, $p$, resting against its outer side and hooking into the frame to hold in place, as represented in Fig. 1. In this position the guide-stem must rise and fall in a vertical line, and consequently the follower also. This arrangement is very cheap and simple, and effective in accomplishing the object desired, obviating the difficulty which has hitherto been experienced, especially where the follower is made of small size, by its inclining and carrying the screw on one side, and thus bending and injuring it.

An additional use of the stem N is for readily handling the follower in the act of lifting it from and replacing in the curb, since it is an important feature of my invention that the follower is disconnected from the screw L and removable from the machine, so as to allow the pressing apparatus to be placed directly beneath the grinding apparatus, and this can only be done by removing the follower when the grinding is to be effected.

The peculiar construction of the frame A, formed, as described, with the cross-piece G, screw socket or nut $a$, and half-section C of the hopper, in a single casting, places the whole in the most compact shape, bringing the hopper directly over the press, and reduces the cost to the lowest degree, while the whole is much more easily transported and requires less fitting than if it were made in a number of separate parts. It also increases the strength, thus requiring less material.

What I claim as my invention, and desire to secure by Letters Patent, is—

1. The construction and arrangement of a grinding-mill and press together, combined and operating substantially as herein specified.

2. The open discharge depression F across the face of the case opposite to the grinding-wheel, in combination with said grinding-wheel, arranged and operating substantially as and for the purpose herein specified.

3. In combination with said depression F, the peculiar construction and arrangement of the teeth $h$ and $h'$, and spiral wedge-shaped hopper, as herein set forth.

4. The guide-stem N, projecting vertically from the removable follower K, and sliding in a lock, *p*, or its equivalent, for the purpose specified.

5. The combination of the curb I, having openings or slots in the lower portion only, with the concave follower K and guide-stem N, substantially as specified.

In witness whereof I have hereunto signed my name in the presence of two subscribing witnesses.

C. B. HUTCHINSON.

Witnesses:
  CHAS. F. SPENCER,
  R. F. OSGOOD.